Feb. 20, 1934. E. F. BEGTRUP 1,947,966

RAIL WELDING MOLD

Filed Feb. 16, 1933

INVENTOR
Edward F. Begtrup
BY
HIS ATTORNEY

Patented Feb. 20, 1934

1,947,966

UNITED STATES PATENT OFFICE 1,947,966

RAIL WELDING MOLD

Edward F. Begtrup, Jersey City, N. J.

Application February 16, 1933. Serial No. 656,995

3 Claims. (Cl. 22—116)

The invention relates to improvements in molds for the alumino-thermic welding of railway rails and the like and has for its object to provide a novel form of mold adapted to largely eliminate the danger of impairment of the weld by the entrance of slag into the mold cavity, due to the hydrostatic head, by limiting the height of the mold, so that the liquid steel above the heads of the rails will not exceed a predetermined low level, preferably about one inch to one and one-half inches, and any surplus steel and substantially all of the molten slag will be diverted or run-off from the mold by means of a special channel associated with the inlet to the pouring gate.

The invention is illustrated in the accompanying drawing, in which:—

Figure 1:
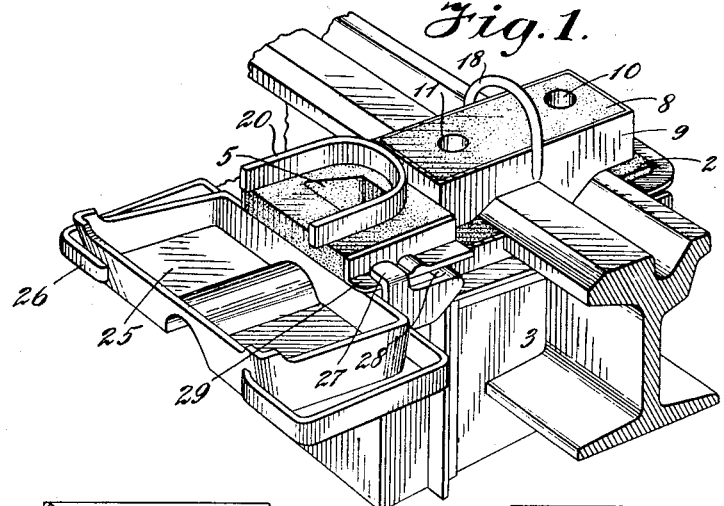
Figure 2:
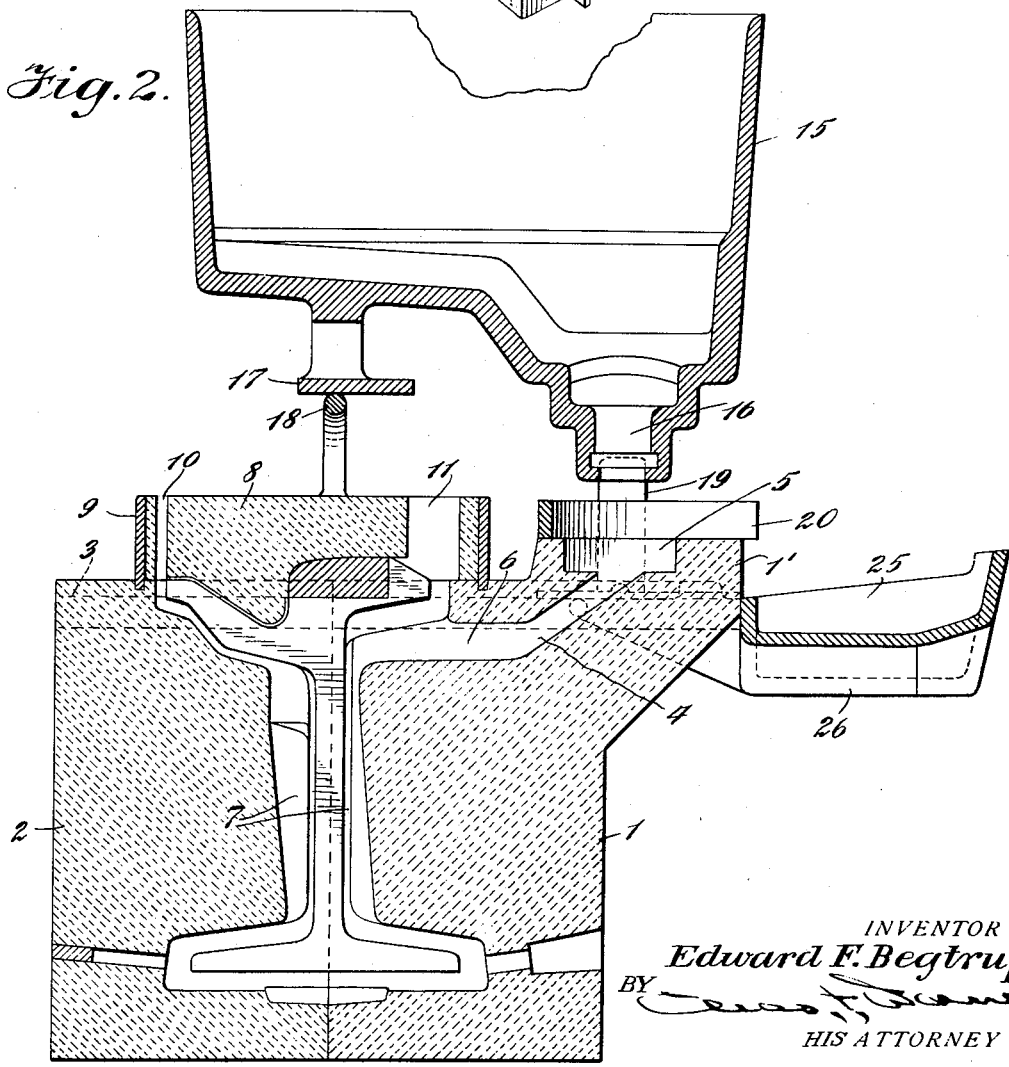

Fig. 1 is a perspective view of the mold as applied to the welding of girder rails, and Fig. 2 is a sectional elevation of the mold and the crucible associated therewith.

In the alumino-thermic welding of rails, it has been the general practice to surround the opposed rail ends with a mold having suitable defining internal cavity walls to direct and retain the superheated molten steel around the rail ends and, in addition, to provide the mold with a top or cope section, either integral or separate, to retain the excess of the superheated steel and slag. The superheated liquid slag is usually retained in a basin immediately above and connected with all of the top openings in the mold, but, in some applications, is retained in a similar basin which is connected only with the pouring gate of the mold. These prior practices frequently resulted in certain unfavorable and undesirable conditions, which not infrequently resulted in unsatisfactory welds. For example, there always existed a static head pressure, due to the body of the liquid slag in the basin, which increased the danger of a run out of the mold contents between the walls of the mold and the surfaces of the rails and also, under certain conditions, caused the superheated molten slag to enter the mold defining space around the rail ends, thereby producing a defective weld. Another undesirable feature of the old practice, particularly in welding rails under traffic, is the increased length of time required before the mold can be stripped from the rails, due to the slow cooling and solidification of the excess mass of superheated liquid steel and slag in the mold and in the basin associated therewith. Also in cases where a separate cope or mold top is employed, the static head pressure of the liquid steel and slag tends to lift or float the cope away from the rail ends, thereby inducing an escape or run-out of the liquid contents of the mold. Furthermore, molds having basins for retaining excess steel and slag are quite cumbersome, difficult to fabricate and require more molding material than molds made in accordance with the present invention, which provides for the elimination of the undesirable features aforesaid by providing a mold so constructed that no static head of liquid slag prevails at any time during or after teeming into the mold and also, regardless of any excess amount of alumino-thermic mixture employed, a determined low level of liquid steel in the mold is maintained without the risk of liquid slag entering the mold cavity.

Referring to the drawing, 1 and 2 indicate the coordinate lower sections of the mold, each of which is formed in a separate flask section, such as 3, said sections enclosing the ends of the rails to substantially the level of the tread surfaces of said rails. One of the mold sections preferably section 1, is provided with an offset 1' in which is located the pouring gate 4, the entrance portion of which is preferably enlarged, as at 5, and formed in a slight upward extension of the lateral offset 1'. Said pouring gate is provided with a horizontal extension 6, which discharges into the mold cavity 7. Associated with the lower mold sections 1 and 2 is a cope section 8, including the usual frame 9 with the filling of refractory material, said cope section having formed therein the usual vents and risers 10 and 11. This particular mold structurally is substantially the same as that of my pending application Serial No. 607,051 and is here shown as associated with a crucible 15 having a tap hole nipple 16 in the bottom thereof, the crucible being supported by a foot piece 17 engaging a bail 18 of the cope and by laterally spaced feet 19 formed integrally with the tap hole nipple 16 engaging the sides of the flask, whereby the crucible is removably supported above the mold with the tap hole nipple in perpendicular alignment with the inlet of the pouring gate.

The enlargement 5 at the mouth of the pouring gate forms a basin which is of sufficient capacity to prevent loss of molten metal when teeming into the mold, and also acts as an equalizer by which any desired rate of flow of metal into the mold can be definitely assured irrespective of the size of the tap hole in the crucible or the rate of flow of the metal from the crucible.

Mounted on the top of the extension 1' of the mold is a rim 20, which may be formed integrally with the mold, but which is preferably a separate element, of general U-shape, to surround the inlet to the pouring gate on all sides except that directed toward the side of the mold, so that, when the molten steel has been teemed into the mold and fills the cavity therein up to the desired height in the vents and risers 10 and 11, any excess of the metal and of the slag following the latter will be diverted away from the mold and may be discharged onto the ground, but is preferably delivered into a pan, such as 25, which is removably supported in a frame 26 supported by lugs 27 and 28 engaging the usual angle bars 29 which constitute the braces or reinforcements for the flask sections, as illustrated in Fig. 1.

By this particular construction of mold and run-off channel, satisfactory results are assured, in that it is impossible with an appropriate initial charge of alumino-thermic mixture to impose any excessive pressure on the liquid steel entering the mold, due to the static head of liquid slag, which resulted under the former practice, and also insures the excess steel and substantially all of the liquid slag being diverted directly away from the mold by the run-off channel or rim 20. As stated, the rim 20 may be made integral with the mold proper, or as a separate element applied thereto whereby it may be readily removed from the mold to provide more clearance for the passing traffic.

Considerable economy accrues from the use of the invention by reason of the possible reduction in the amount of alumino-thermic mixture that may be used with safety, without the possibility of molten slag entering the mold cavity in which the weld is formed. In molds of the ordinary type where no run-off channel is employed, a greater static head of molten slag accumulates in the pouring gate and, therefore, for practical purposes, a greater amount of alumino-thermic mixture must be used, in order to produce an excess of molten steel to insure that the increased static head of molten slag does not depress the molten steel in the pouring gate to a point where the slag could enter the mold cavity and impair the weld. With the present invention, it is entirely unnecessary to provide any additional alumino-thermic mixture to guard against the conditions just described, and, in fact, the alumino-thermic mixture for each welding operation may be readily calculated to provide just sufficient molten steel to completely fill the mold space and extend part way into the riser or vent openings.

What I claim is:

1. A mold for alumino-thermic welding of rails and the like, comprising body and cope sections, said body section having a pouring gate at one side of the top thereof and a rim surrounding the inlet of the gate on three sides and serving to divert excess metal and slag away from the mold, said rim being removably mounted on the top of the mold.

2. A mold for alumino-thermic welding of rails and the like, comprising body and cope sections, said body section extending to substantially the level of the tread surfaces of the rails and having a pouring gate at one side of the top thereof with its inlet slightly higher than the said tread surfaces and a run-off channel communicating with said inlet to divert excess metal and slag from the mold, said run-off channel being formed by a removable rim partly surrounding the inlet of the pouring gate.

3. A mold for alumino-thermic welding of rails and the like having a pouring gate, the inlet of which is slightly higher than the tops of the parts to be welded and is enlarged to form a basin at the mouth thereof, and a rim surrounding the inlet on three sides and serving to divert excess metal and slag away from the mold, said rim being removably mounted on the top of the mold.

EDWARD F. BEGTRUP.